(12) United States Patent
Wu et al.

(10) Patent No.: US 11,826,593 B2
(45) Date of Patent: Nov. 28, 2023

(54) FIRE-FIGHTING APPARATUS, BOX ASSEMBLY, BATTERY, POWER CONSUMPTION APPARATUS, AND METHOD FOR PREPARING BATTERY

(71) Applicant: JIANGSU CONTEMPORARY AMPEREX TECHNOLOGY LIMITED, Liyang (CN)

(72) Inventors: Kai Wu, Liyang (CN); Zhiming Chen, Liyang (CN); Boxiang Liao, Liyang (CN)

(73) Assignee: JIANGSU CONTEMPORARY AMPEREX TECHNOLOGY LIMITED, Liyang (CN)

( * ) Notice: Subject to any disclaimer, the term of this patent is extended or adjusted under 35 U.S.C. 154(b) by 0 days.

(21) Appl. No.: 17/718,832

(22) Filed: Apr. 12, 2022

(65) Prior Publication Data
US 2022/0233899 A1 Jul. 28, 2022

Related U.S. Application Data

(63) Continuation of application No. PCT/CN2020/129433, filed on Nov. 17, 2020.

(51) Int. Cl.
*A62C 3/16* (2006.01)
*A62C 35/62* (2006.01)
(Continued)

(52) U.S. Cl.
CPC ............... *A62C 3/16* (2013.01); *A62C 35/62* (2013.01); *H01M 50/358* (2021.01); *H01M 50/383* (2021.01); *A62C 3/07* (2013.01)

(58) Field of Classification Search
CPC .... A62C 3/07; A62C 3/16; A62C 4/02; A62C 35/62; H01M 50/30; H01M 50/35;
(Continued)

(56) References Cited

U.S. PATENT DOCUMENTS

2014/0186668 A1* 7/2014 Jung ................... H01M 10/613
429/61
2020/0235359 A1* 7/2020 Hayashi .............. H01M 50/358
(Continued)

FOREIGN PATENT DOCUMENTS

CN 101523637 A 9/2009
CN 101542776 A 9/2009
(Continued)

OTHER PUBLICATIONS

Extended European Search Report dated Jul. 19, 2022 received in European Patent Application No. EP 20939484.0.
(Continued)

*Primary Examiner* — Darren W Gorman
(74) *Attorney, Agent, or Firm* — Scully, Scott, Murphy & Presser, P.C.

(57) ABSTRACT

The present application provides a fire-fighting apparatus, a box assembly, a battery, a power consumption apparatus, and a method for preparing a battery. The fire-fighting apparatus includes: a pipe, a gas release mechanism, and a blocking structure. The pipe has an air inlet end and an air outlet end, and the air inlet end is configured to be connected to the battery, so that a combustible gas generated in the battery during thermal runaway events is capable of entering the pipe from the box via the air inlet end and being discharged from the pipe via the air outlet end; and the gas release mechanism is configured to be connected to the pipe and release a fire-fighting gas into the pipe when thermal runaway occurs in the battery; and the blocking structure is configured to block the combustible gas and the fire-fighting gas and change a flow direction.

14 Claims, 11 Drawing Sheets

(51) Int. Cl.
H01M 50/383 (2021.01)
H01M 50/358 (2021.01)
*A62C 3/07* (2006.01)

(58) Field of Classification Search
CPC ............. H01M 50/358; H01M 50/383; H01M 2200/00; H01M 2200/10; H01M 2200/20
See application file for complete search history.

(56) References Cited

U.S. PATENT DOCUMENTS

| | | | | |
|---|---|---|---|---|
| 2021/0066690 | A1* | 3/2021 | Gondoh | ............... H01M 50/249 |
| 2022/0013758 | A1* | 1/2022 | Kang | ................ H01M 10/6566 |
| 2022/0077540 | A1* | 3/2022 | Wakabayashi | ...... H01M 50/383 |
| 2022/0223969 | A1* | 7/2022 | Ben Salah | .............. B60L 50/64 |
| 2022/0407177 | A1* | 12/2022 | Zhang | .................... B01D 46/12 |

FOREIGN PATENT DOCUMENTS

| | | | |
|---|---|---|---|
| CN | 205508970 | U | 8/2016 |
| CN | 107303471 | A | 10/2017 |
| CN | 207409561 | U | 5/2018 |
| CN | 108879001 | A | 11/2018 |
| CN | 109103388 | A | 12/2018 |
| CN | 109103391 | A | 12/2018 |
| CN | 109103392 | A | 12/2018 |
| CN | 208548429 | U | 2/2019 |
| CN | 110459719 | A | 11/2019 |
| CN | 211789233 | U | 10/2020 |
| DE | 102012019676 | A1 | 4/2014 |
| JP | H0412606 | Y2 | 3/1992 |
| JP | 2013161735 | A | 8/2013 |
| JP | 2016110881 | A | 6/2016 |
| JP | 2019057469 | A | 4/2019 |
| JP | 2019057470 | A | 4/2019 |
| KR | 20130032963 | A | 4/2013 |
| WO | WO-2010089000 | A2 * | 8/2010 ............ H01M 10/52 |
| WO | 2020039722 | A1 | 2/2020 |

OTHER PUBLICATIONS

Notice of Reasons for Refusal dated Oct. 16, 2023 received in Japanese Patent Application Np. JP 2022-557943.
Notice of Allowance dated Oct. 10, 2023 recieved in Korean Patent Application No. KR 10-2022-7033639.

* cited by examiner

FIRE-FIGHTING APPARATUS, BOX ASSEMBLY, BATTERY, POWER CONSUMPTION APPARATUS, AND METHOD FOR PREPARING BATTERY

CROSS-REFERENCE TO RELATED APPLICATIONS

This application is a continuation of International Application No. PCT/CN2020/129433, filed on Nov. 17, 2020, the disclosure of which is hereby incorporated by reference in its entirety.

TECHNICAL FIELD

The present application relates to the technical field of battery safety, and in particular, to a fire-fighting apparatus, a box assembly, a battery, a power consumption apparatus, and a method for preparing a battery.

BACKGROUND

As an energy storage device, a battery is a core component of a hybrid vehicle and an electric vehicle. When the battery is overcharged or over-discharged or short-circuited, thermal runaway occurs, and a combustible gas emitted may explode and cause a fire. Therefore, fireproofing processing requires to be performed on the battery.

SUMMARY

The present application aims to provide a fire-fighting apparatus, a box assembly, a battery, a power consumption apparatus, and a method for preparing a battery, so as to reduce the risk of open flames when thermal runaway occurs in the battery.

In a first aspect, an embodiment of the present application provides a fire-fighting apparatus configured for a battery, including: a pipe, a gas release mechanism, and a blocking structure. The pipe has an air inlet end and an air outlet end, and the air inlet end is configured to be connected to a box of the battery, so that a combustible gas generated in the battery during thermal runaway events is capable of entering the pipe from the box via the air inlet end and being discharged from the pipe via the air outlet end; and the gas release mechanism is configured to be connected to the pipe, and the gas release mechanism is configured to release a fire-fighting gas into the pipe when thermal runaway occurs in the battery; where a blocking structure is provided in the pipe, and the blocking structure is configured to block the combustible gas and the fire-fighting gas and change a flow direction, so that the combustible gas and the fire-fighting gas are capable of being mixed before being discharged from the pipe.

In the forgoing technical solution, when thermal runaway occurs in a battery, a combustible gas inside a box enters a pipe via an air inlet end of the pipe, so that an air pressure inside the box of the battery is reduced, and an explosion caused by excessive air pressure inside the box is avoided. In addition, a fire-fighting gas is produced, which quickly fills the pipe, and drives the combustible gas to be discharged from an air outlet end of the pipe after being mixed with the combustible gas. Therefore, it is possible to provide a barrier between the outside air and the combustible gas discharged from the box.

Furthermore, a blocking structure allows the fire-fighting gas and the combustible gas to mix in the pipe, to reduce the concentration of the combustible gas in the pipe, so that the mixed gas discharged from the air outlet end of the pipe is not easy to catch fire or explode when it comes into contact with air. In addition, the fire-fighting gas is also beneficial for lowering a temperature of the combustible gas, thereby further preventing the occurrence of open flames.

Therefore, the fire-fighting apparatus provided by the foregoing solution of the present application could reduce the risk of open flames when thermal runaway occurs in the battery, while suppressing the spread of thermal runaway in the battery, which extends the safety evacuation time of a person, and achieves the purpose of fire prevention and safety protection.

In some embodiments of the present application, the blocking structure is configured to make a flow path of at least part of a gas in the pipe a meandering shape.

In the foregoing technical solution, advantages of a gas traveling in the pipe in a meandering manner are as follows: on one hand, a mixing path of the fire-fighting gas and the combustible gas can be extended, and a mixing time of the fire-fighting gas and the combustible gas can be increased, thereby improving the mixing effect of the two; on another hand, traveling in a meandering manner intensifies the colliding and mixing of the fire-fighting gas and the combustible gas, thereby improving the mixing effect of the two and reducing the situation of the occurrence of fire due to the excessive-high local concentration of the combustible gas discharged from the pipe.

In some embodiments of the present application, a projection of the blocking structure in an extension direction of the pipe covers a projection of a cavity of the pipe in the extension direction of the pipe.

In the foregoing technical solution, a projection of the blocking structure in an extension direction of the pipe covers a projection of a cavity (that is, an internal passage) of the pipe in the extension direction of the pipe, so that the combustible gas discharged from the box and the fire-fighting gas both in the pipe flow through the blocking structure and travel in a meandering manner rather than in a straight line.

In some embodiments of the present application, the blocking structure includes a plurality of baffle plates, the plurality of baffle plates are arranged at interval in an extension direction of the pipe, and the baffle plate is provided with an opening for a gas to pass through, or the baffle plate encloses with an inner wall of the pipe to form an opening for a gas to pass through, where projections of two adjacent openings in the extension direction of the pipe are disposed to be misaligned.

In the foregoing technical solution, when the gas flows through a plurality of baffle plates, a flow path of the gas is a meandering path. In addition, the baffle plate can not only mix gases, but also prevent a high-temperature particle entering the pipe from the box from flowing out of the pipe, thereby avoiding risks that may be caused by the outflow of the high-temperature particle, such as causing a fire.

In some embodiments of the present application, the plurality of baffle plates at least includes a pair of arc-shaped plates, and concave surfaces of the pair of arc-shaped plates are disposed opposite to each other.

In the foregoing technical solution, since concave surfaces of a pair of arc-shaped plates are disposed opposite to each other, when a gas enters an interval of the pair of arc-shaped plates, a concave surface of one arc-shaped plate of the pair of arc-shaped plates can guide the gas toward the other arc-shaped plate, which could intensify the collision of gases between the pair of arc-shaped plates and increase the mixing time of the gases, and thus it is beneficial for a full mixing of the fire-fighting gas and the combustible gas.

In some embodiments of the present application, the blocking structure includes a spiral blade, and a centerline of the spiral blade coincides with or is parallel to a central axis of the pipe.

In the foregoing technical solution, the spiral blade can make a flow path of the mixed gas a spiral shape, which is beneficial for full mixing of the fire-fighting gas and the combustible gas.

In some embodiments of the present application, the blocking structure includes a plurality of spiral blades, the plurality of spiral blades are arranged in an extension direction of the pipe, and directions of rotation of two adjacent spiral blades are opposite.

In the foregoing technical solution, spiral blades with two different directions of rotation may change a direction of rotation of the gas, which could further enhance the effect of mixing the gases.

In some embodiments of the present application, the gas release mechanism is installed at the pipe.

In the foregoing technical solution, it is beneficial for shortening the time for the fire-fighting gas to enter the pipe, and an intermediate connector between the gas release mechanism and the pipe is omitted, which could simplify the structure and save the cost.

In some embodiments of the present application, an installation position of the gas release mechanism while compared with the blocking structure, is closer to the air inlet end.

In the foregoing technical solution, it is beneficial for mixing the fire-fighting gas and the combustible gas, thereby ensuring the mixing effect of the blocking structure on the fire-fighting gas and combustible gas.

In some embodiments of the present application, the gas release mechanism is provided outside the pipe, a through hole is provided on a wall of the pipe, and the gas release mechanism is connected to the through hole, to release the fire-fighting gas into the pipe through the through hole.

In some embodiments of the present application, the through hole is multiple in quantity, and the multiple through holes are arranged at interval in an extension direction of the pipe.

In the foregoing technical solution, multiple through holes may ensure a rapid release of a sufficient amount of fire-fighting gas, thereby ensuring the reliability of fire prevention.

In some embodiments of the present application, the gas release mechanism includes: a fire-fighting medium, a housing, and a closure member. The fire-fighting medium is the fire-fighting gas, or, a fire-fighting solid or a fire-fighting liquid capable of generating the fire-fighting gas; the housing is configured to accommodate the fire-fighting medium, and the housing is connected to the through hole and is provided with an air outlet hole; and the closure member is configured to close the air outlet hole, and the closure member is configured to be capable of releasing closure of the air outlet hole when thermal runaway occurs in the battery, so that the fire-fighting gas enters the pipe through the air outlet hole.

In some embodiments of the present application, the fire-fighting medium is the fire-fighting solid or the fire-fighting liquid, and the gas release mechanism further includes a trigger, the trigger is configured to trigger the fire-fighting solid or the fire-fighting liquid when thermal runaway occurs in the battery to generate the fire-fighting gas, and the closure member is configured to be capable of opening the air outlet hole when an air pressure in the housing reaches a first threshold to release the fire-fighting gas.

In some embodiments of the present application, the fire-fighting medium is the fire-fighting liquid or the fire-fighting gas capable of generating the fire-fighting gas, and the fire-fighting liquid or the fire-fighting gas is encapsulated in the housing, and when the air outlet hole is enclosed by the closure member, a pressure in the housing is larger than a pressure in the pipe, and the closure member is a valve.

In some embodiments of the present application, a length of the pipe is 50-200 cm.

In the foregoing technical solution, advantages of setting the length of the pipe within such a range are as follows: first, it facilitates the installation of the gas release mechanism, which is beneficial for the installation of a plurality of gas release mechanisms; second, a distance for lowering a temperature is increased, so that the mixed gas of the fire-fighting gas and the combustible gas has a sufficient distance for lowering a temperature, and thus the possibility of catching a fire at the air outlet end of the pipe is reduced; and third, a distance for exchanging the oxygen is increased, so that a high-temperature region near the box becomes an oxygen-deficient region, thereby reducing the risk of open flames in the high-temperature region.

In some embodiments of the present application, the fire-fighting apparatus further includes a gas collection device, and the gas collection device is hermetically connected to the air outlet end to collect a gas discharged from the air outlet end.

In the foregoing technical solution, a gas collection device is provided, which could prevent the mixed gas from being directly discharged to the external environment and polluting the environment.

In a second aspect, an embodiment of the present application provides a box assembly, including: a box, a pressure relief mechanism, and the fire-fighting apparatus provided according to the embodiment of the first aspect; the box is configured to accommodate a battery cell; the fire-fighting apparatus is provided outside the box, and the air inlet end of the fire-fighting apparatus is connected to the box; and the pressure relief mechanism is configured to be actuated when an air pressure or temperature in the box reaches a second threshold, so that a combustible gas in the box is capable of entering the pipe from the air inlet end.

In some embodiments of the present application, the pressure relief mechanism is provided on the box, and the air inlet end is provided on the pressure relief mechanism while covering it.

In a third aspect, an embodiment of the present application provides a battery, including a battery cell, and the box assembly provided according to the embodiment of the second aspect; and the battery cell is provided in the box.

In a fourth aspect, an embodiment of the present application provides a power consumption apparatus, including the battery provided by the third aspect.

In a fifth aspect, a method for producing a battery is provided, including providing a battery cell; providing a box; providing a fire-fighting apparatus, the fire-fighting apparatus including: a pipe and a gas release mechanism, the pipe having an air inlet end and an air outlet end, and the air inlet end being configured to be connected to the box, so that a combustible gas generated in the battery during thermal runaway events in the battery is capable of entering the pipe from the box via the air inlet end and being discharged from the pipe via the air outlet end; and the gas release mechanism being connected to the pipe, and the gas release mechanism being configured to release a fire-fighting gas into the pipe when thermal runaway occurs in the battery; where a blocking structure is provided in the pipe, and the blocking structure is configured to block the combustible gas and the fire-fighting gas and change a flow direction, so that the combustible gas and the fire-fighting gas are capable of being mixed before being discharged from the pipe; disposing the battery cell in the box; and disposing the fire-fighting apparatus outside the box, and connecting the air inlet end to the box.

BRIEF DESCRIPTION OF THE DRAWINGS

To describe the technical solutions in the embodiments of the present application more clearly, the following briefly introduces accompanying drawings required for describing the embodiments. It should be understood that the following accompanying drawings only show some of the embodiments of the present application, and thus should not be regarded as limitation on the scope; and a person of ordinary skill in the art may still derive other drawings from these accompanying drawings without creative efforts.

DESCRIPTION OF EMBODIMENTS

Figure 1:
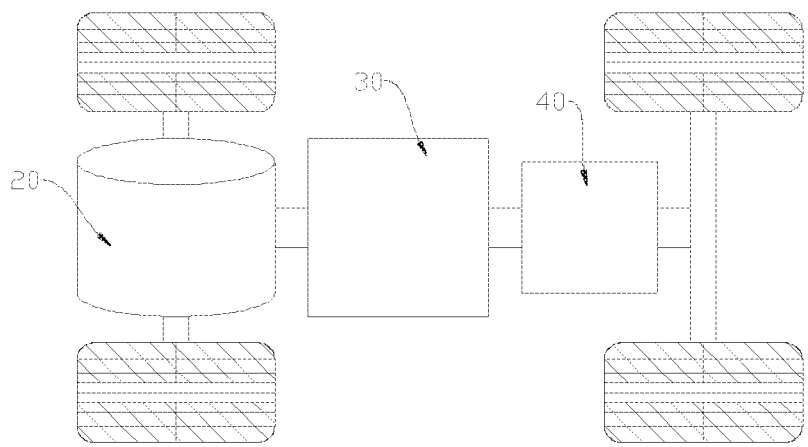
FIG. 1 is a schematic diagram of a vehicle provided by an embodiment of the present application.

To describe the technical solutions in the embodiments of the present application more clearly, the following briefly introduces accompanying drawings required for describing the embodiments. It should be understood that the following accompanying drawings only show some of the embodiments of the present application, and thus should not be regarded as limitation on the scope; and a person of ordinary skill in the art may still derive other drawings from these accompanying drawings without creative efforts.

To make the objectives, technical solutions and advantages of the embodiments of the present application clearer, the following clearly and completely describes the technical solutions in the embodiments of the present application with reference to the accompanying drawings in the embodiments of the present application. Apparently, the described embodiments are merely some but not all of the embodiments of the present application. Generally, components of the embodiments of the present application described and illustrated in the accompanying drawings herein may be arranged and designed in various different configurations.

Therefore, the following detailed description of the embodiments of the present application provided in the accompanying drawings is not intended to limit the protection scope of the present application, but only represents the selected embodiment of the present application. All other embodiments obtained by a person of ordinary skill in the art based on the embodiments of the present application without creative efforts shah fall within the protection scope of the present application.

It shall be noted that the embodiments of the present application and the characteristics in the embodiments may be combined with each other in the case of no conflict. It should be noted that similar reference signs and letters indicate similar items in the following accompanying drawings. Therefore, once a certain item is defined in one drawing, it is not necessary to further define and explain it in the following accompanying drawings.

In the description of the embodiments of the present application, it should be noted that the indication of orientation or positional relationship is based on the orientation or positional relationship shown in the accompanying drawings, or the orientation or positional relationship usually placed when the product of the present application is used, or the orientation or positional relationship commonly understood by a person of skilled in the art, which is merely for convenience of describing the present application and for simplifying the description, rather than for indicating or implying that an apparatus or element indicated must have a specific orientation, and must be constructed and operated in a specific orientation, which thus may not be understood as limitation to the present application. In addition, the terms "first", "second", and "third" are only used to distinguish descriptions, and shall not be understood as an indication or implication of relative importance.

In the description of the present invention, it should also be noted that unless otherwise explicitly specified and defined, the terms "disposing", "mounting", "connecting" and "connection" should be understood in a broad sense, for example, they may be a fixed connection, a detachable connection, or an integrated connection, may be a mechanical connection, or may be an electrical connection, may be a direct connection and may also be an indirect connection via an intermediate medium, or may be communication between the interiors of two elements. A person of ordinary skill in the art may appreciate the specific meanings of the foregoing terms in the present application according to specific conditions.

In addition, the battery mentioned in the embodiment of the present application refers to a single physical module that includes one or more battery cells to provide a higher voltage and capacity. For example, the battery mentioned in the present application may include a battery pack or a battery module. The battery generally includes a box for enclosing one or more battery cells. The box may prevent a liquid or other foreign matters from affecting the charging or discharging of the battery cell.

A plurality of battery cells are connected in series and/or in parallel via a bus component to be applied to various applications. In some high-power applications such as electric vehicles, there are generally three levels: a battery cell, a battery module, and a battery pack. The battery module is to electrically connect a certain number of battery cells together. The battery pack is composed of one or more battery modules in a sealed box, and the battery pack is connected to a chassis of the electric vehicle through the box.

A battery cell may include a lithium-ion secondary battery, a lithium-ion primary battery, a lithium-sulfur battery, a sodium/lithium-ion battery, a sodium-ion battery or a magnesium-ion battery, etc., which is not limited by the embodiments of the present application. The battery cell may be cylindrical, flat, cuboid or another shape, which is also not limited by the embodiments of the present application. The battery cell is generally divided into three types according to the way of packaging: a cylindrical battery cell, a prismatic battery cell and a pouch battery cell, which is not limited by the embodiments of the present application.

The battery cell includes an electrode assembly and an electrolytic solution, and the electrode assembly is composed of a positive electrode sheet, a negative electrode sheet and an isolation film. The operation of the battery cell mainly relies on the movement of metal ions between the positive electrode sheet and the negative electrode sheet. The positive electrode sheet includes a positive electrode current collector and a positive active material layer. The positive active material layer is coated on a surface of the positive electrode current collector, and the current collector not coated with the positive active material layer protrudes from the current collector coated with the positive active material layer and is used as a positive electrode tab. Taking a lithium-ion battery as an example, the material of the positive electrode current collector may be aluminum and the positive active material may be lithium cobalt oxides, lithium iron phosphate, ternary lithium or lithium manganate, or the like. The negative electrode sheet includes a negative electrode current collector and a negative active material layer. The negative active material layer is coated on a surface of the negative electrode current collector, and the current collector not coated with the negative active material layer protrudes from the current collector coated with the negative active material layer and is used as a negative electrode tab. The material of the negative electrode current collector may be copper, and the negative electrode active material may be carbon or silicon, etc. In order to ensure that no fusing occurs when a large current passes, there are a plurality of positive electrode tabs which are stacked together, and there are a plurality of negative electrode tabs which are stacked together. A material of the isolation film/ may be PP (polypropylene), PE (polyethylene: or the like. In addition, the electrode assembly may have a winding structure or a laminated structure, and the embodiments of the present application are not limited thereto.

The development of the battery technology must consider many design factors at the time, such as energy density, cycle life, discharge capacity, C-rate and other performance parameters. In addition, the safety of the battery should also be considered.

During the use of the battery, due to short circuit, overcharge, collision and other reasons, a large amount of gas may be generated and the temperature may rise rapidly inside the battery cell in a short time, which may eventually cause explosion and fire of the battery cell, resulting in safety risks. In order to solve this problem, a pressure relief mechanism is usually provided on the battery cell. When the pressure relief mechanism is actuated, high-temperature and high-pressure substances inside the battery cell as emissions are discharged outwards from an actuated position, that is, into the battery box. In this way, the pressure and temperature in the battery cell may be relieved in the case of a controllable pressure or temperature, thereby avoiding potentially more serious accidents. However, when there are too many high-temperature and high-pressure substances discharged from the battery cell into the box, there is also a possibility of explosion and fire after the internal pressure or temperature of the box of the battery reaches a certain value.

Therefore, a pressure relief mechanism is also provided on the box of the battery, to control the internal pressure or temperature of the box.

The pressure relief mechanism refers to an element or component that is actuated to relieve an internal pressure or temperature when the internal pressure or temperature of the battery cell or box where it is located reaches a predetermined threshold. The threshold design varies according to different design requirements, and the threshold of the pressure relief mechanism on the battery cell may depend on the material of one or more of the positive electrode sheet, the negative electrode sheet, the electrolytic solution and the isolation film in the battery cell. The threshold of the pressure relief mechanism on the box of the battery may depend on the number of battery cells inside the box, the material of one or more of the positive electrode sheet, the negative electrode sheet, the electrolytic solution and the isolation film in each battery cell, and the material of the box itself.

The pressure relief mechanism may take the form of an explosion-proof valve, an air valve, a pressure relief valve or a safety valve, etc., and may specifically adopt a pressure-sensitive or temperature-sensitive element or structure. That is, when the internal pressure or temperature of the battery cell or box where the pressure relief mechanism is located reaches a predetermined threshold, the pressure relief mechanism performs an action or a weakened structure provided in the pressure relief mechanism is damaged, so as to form an opening or channel for relieving the internal pressure or temperature.

The "actuation" mentioned in the present application means that the pressure relief mechanism acts or is activated to a certain state, such that the internal pressure and temperature of the battery cell or box can be relieved. The action generated by the pressure relief mechanism may include but be not limited to: at least a portion of the pressure relief mechanism being fractured, broken, torn or opened, and so on.

The emissions mentioned in the present application include but are not limited to: the electrolytic; solution, high-temperature particles (such as the dissolved or split positive and negative electrode sheets, or fragments of the isolation film), high-temperature and high-pressure gases generated by reaction such as combustible gases such as $H_2$ and CO), flames, etc.

During the use of the battery, a large amount of gas is generated and the temperature rises rapidly inside the battery cell in a short time, which causes the pressure relief mechanism on the battery cell to be actuated, to discharge a large amount of gas into the box of the battery, causes a large amount of gas the box to gather and the temperature to rise, and may eventually cause explosion and fire of the battery. This phenomenon is called thermal runaway of the battery.

When thermal runaway occurs in the battery, the pressure relief mechanism on the box of the battery is actuated to relieve the pressure or temperature in the battery. However, in the prior art, the pressure relief mechanism on the box is directly exposed to the air, which causes the high-temperature gas generated when thermal runaway occurs in the battery to come in contact with oxygen in the air after being discharged by the pressure relief mechanism, which is easy to produce open flames, resulting in explosion and fire.

In view of this, the present application provides a fire-fighting apparatus 500 which can be configured for a battery 40. With the fire-fighting apparatus 500, the risk of open flames when thermal runaway occurs in the battery 40 can be reduced, and the spread of the thermal runaway of the battery 40 can be suppressed, thereby achieving the purpose of fire prevention and safety protection.

An embodiment of the present application provides a power consumption apparatus using a battery 40 as a power source, and the power consumption apparatus may be, but is not limited to, a vehicle, a ship or an aircraft, or the like.

It can be understood that the battery described in the embodiment of the present application is applicable to various apparatuses using apparatus batteries, such as mobile phones, notebook computers, battery carts, electric vehicles, ships, spacecrafts, electric toys and electric tools, etc., for example, the spacecrafts include rockets, space shuttles and spaceships, etc.; the electric toys include fixed or mobile electric toys, such as gauge consoles, electric vehicle toys, electric ship toys and electric airplane toys, etc.; the electric tools include metal cutting power tools, grinding power tools, assembly power tools and railway power tools, such as electric drills, electric grinders, electric wrenches, electric screwdrivers, electric hammers, concrete vibrators, and electric planers.

The battery 40 described in an embodiment of the present application is not only applicable to the power consumption apparatus described above, but also applicable to all apparatuses that use batteries.

As shown in FIG. 1, FIG. 1 is a schematic structural diagram of a vehicle 10 according to an embodiment of the present application. The vehicle 10 may be a fuel-powered vehicle, a gas-powered vehicle or a new energy vehicle. The new energy vehicle may be a battery electric vehicle, a hybrid vehicle or an extended-range vehicle, or the like. A motor 20, a controller 30 and a battery 40 may be provided inside the vehicle 10, and the controller 30 is configured to control the battery 40 to supply power to the motor 20, for example, the battery 40 is provided at the bottom or head of the vehicle 10. The battery 40 may be configured to supply power to the vehicle 10. For example, the battery 40 may be configured as an operation power source of the vehicle 10 and is configured to a circuit system of the vehicle 10, for example, for a working power demand of the vehicle 10 during startup, navigation and running.

In another embodiment of the present application, the battery 40 may be configured not only as an operation power source of the vehicle 10, but also as a driving power source of the vehicle 10, replacing or partially replacing fuel or natural gas to provide driving power for the vehicle 10.

Figure 2:
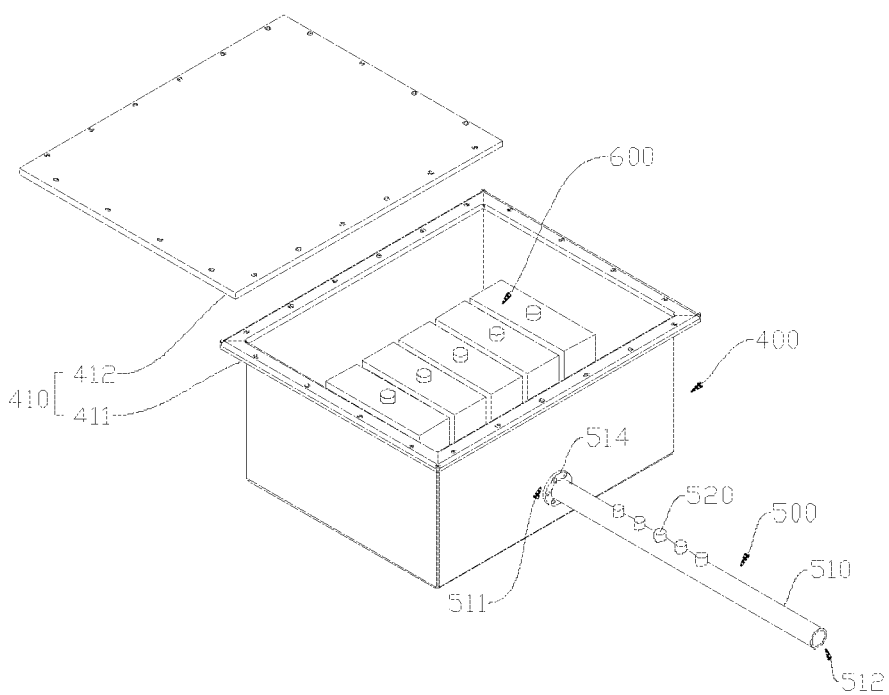
FIG. 2 is an exploded schematic diagram of a battery provided by an embodiment of the present application.

In some embodiments, the vehicle 10 is powered by a battery 40 as shown in FIG. 2. The battery 40 may include a box assembly 400 and a battery cell 600, the battery assembly 400 includes a box 410, and the battery cell 600 is provided in the box 410.

Figure 3:
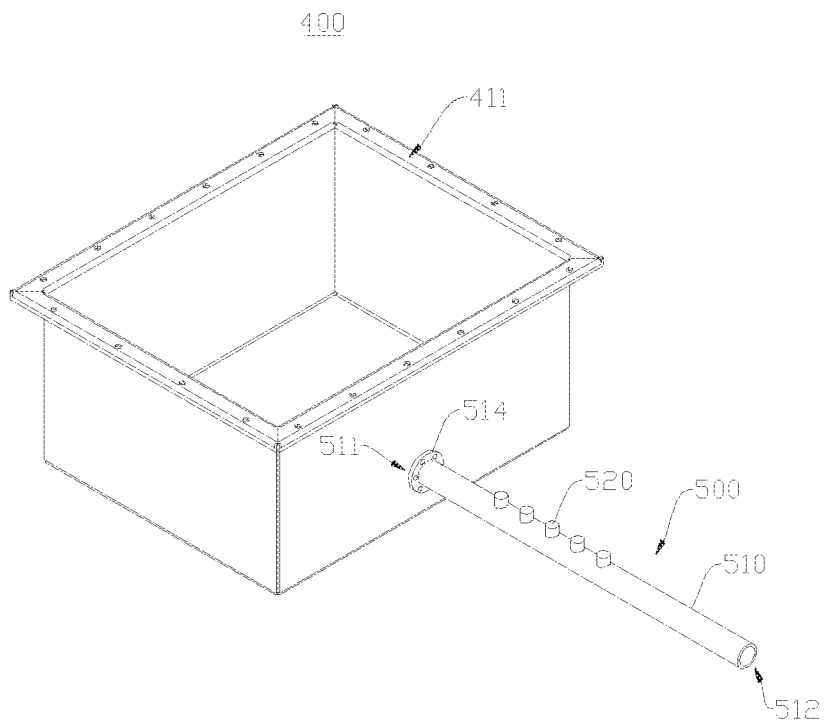
FIG. 3 is a schematic diagram of a three-dimensional structure of a box assembly provided by an embodiment of the present application, where an upper cover body is not shown.
Figure 4:
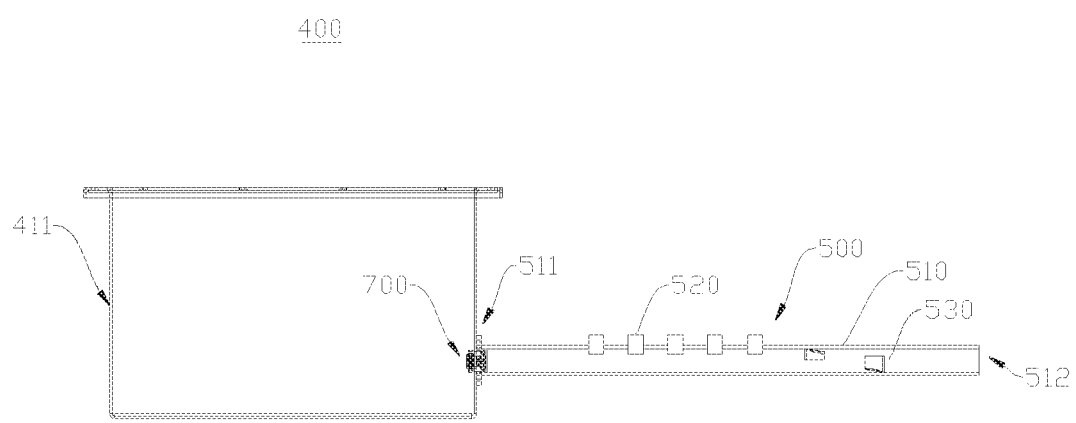
FIG. 4 is a schematic front view of a box assembly provided by an embodiment of the present application, where an upper cover body is not shown.

As shown in FIG. 2-4, the box assembly 400 provided by an embodiment of the present application may include the foregoing box 410, a fire-fighting apparatus 500 and a pressure relief mechanism 700. The fire-fighting apparatus 500 is provided outside the box 410, and the fire-fighting apparatus 500 includes a pipe 510, and an air inlet end 511 of the pipe 510 is connected to the box 410, for example, the air inlet end 511 is connected to the box 410 through the pressure relief mechanism 700.

In an embodiment of the present application, the pressure relief mechanism 700 is configured to be actuated when an air pressure or temperature in the box 410 reaches a preset value (for example, when an air pressure or temperature reaches a second threshold), so that a combustible gas in the box 410 can enter the fire-fighting apparatus 500 through the air inlet end 511. In this way, when thermal runaway occurs in the battery 40, the combustible gas generated by the thermal runaway of the battery cell 600 in the box 410 can be discharged into the fire-fighting apparatus 500 via the pressure relief mechanism 700, so that the fire-fighting apparatus 500 performs fire-fighting processing on the foregoing combustible gas, thereby reducing the possibility of fire, and simultaneously reducing the air pressure inside the box 410 in time to prevent explosion.

In an embodiment of the present application, the pressure relief mechanism 700 may be provided on the box 410, or provided on the fire-fighting apparatus 500, for example, provided on the pipe 510 of the fire-fighting apparatus 500.

As shown in FIG. 2-4, in an embodiment of the present application, the pressure relief mechanism 700 is provided on the box 410, and the air inlet end 511 of the pipe 510 is provided on the pressure relief mechanism 700 while covering it, so that all combustible gases coming out through the pressure relief mechanism 700 can enter the pipe 510. In other embodiments of the present application, the pressure relief mechanism 700 may be provided at the air inlet end 511.

In an embodiment of the present application, as shown in FIG. 2-4, the box 410 may include a lower box 411 and an upper cover body 412, and the upper cover body 412 is hermetically covered on the lower box 411. The fire-fighting apparatus 500 may be connected to the lower box 411. In other embodiments of the present application, the fire-fighting apparatus 500 may be connected to the upper cover body 412 of the box 410.

Figure 5:
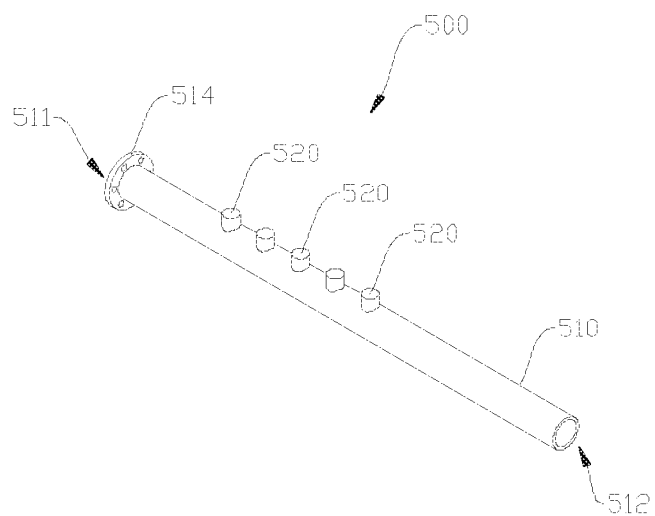
FIG. 5 is a schematic diagram of a three-dimensional structure of a fire-fighting apparatus provided by an embodiment of the present application.
Figure 6:
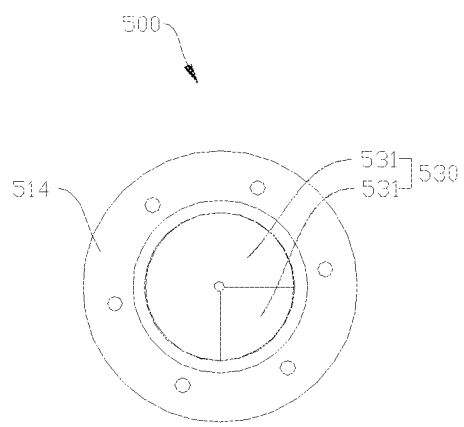
FIG. 6 is a schematic left view of a fire-fighting apparatus provided by an embodiment of the present application.
Figure 7:
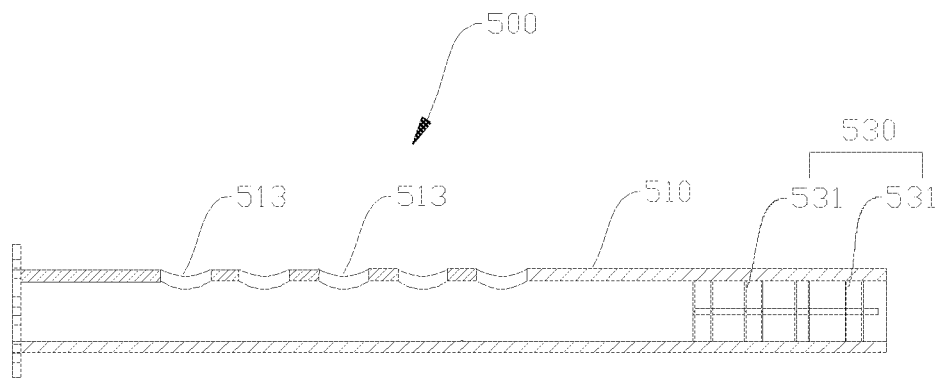
FIG. 7 is a schematic cross-sectional landscape diagram of a fire-fighting apparatus provided by an embodiment of the present application, where a gas release mechanism is not shown.

As shown in FIG. 5-7, a fire-fighting apparatus 500 provided by an embodiment of the present application may include a pipe 510, a gas release mechanism 520, and a Hocking structure 530. The pipe 510 has an air inlet end 511 and an air outlet end 512. The air inlet end 511 is configured to be connected to a box 410 of the battery 40, so that a combustible gas generated in the battery 40 during a thermal runaway event is capable of entering the pipe 510 from the box 410 via the air inlet end 511 and being discharged from the pipe 510 via the air outlet end 512. The gas release mechanism 520 is configured to be connected to the pipe 510, and the gas release mechanism 520 is configured to release a fire-fighting gas into the pipe 510 when thermal runaway occurs in the battery 40. A blocking structure 530 is provided in the pipe 510, and is configured to block the fire-fighting gas and combustible gas and change a flow direction, so that the fire-fighting gas and combustible gas are capable of being mixed before being discharged from the pipe 510.

With the foregoing technical solution, when thermal runaway occurs in the battery 40, the combustible gas inside the box 410 enters the pipe 510 via the air inlet end 511 of the pipe 510, so that an air pressure inside the box 410 of the battery 40 is reduced, and the possibility of explosion caused by excessive air pressure inside the box 410 is reduced. In addition, a fire-fighting gas is produced, which quickly fills the pipe 510, and drives the combustible gas to be discharged from the air outlet end 512 of the pipe 510 after being mixed with the combustible gas. Therefore, it is possible to provide a barrier between the external air and the combustible gas discharged from the box 4101.

Furthermore, a blocking structure 530 allows the combustible gas and the fire-fighting gas to mix in the pipe 510, to reduce the concentration of the combustible gas in the pipe 510, so that the mixed gas discharged from the air outlet end 512 of the pipe 510 is not easy to catch fire or explode when it comes into contact with air. In addition, the fire-fighting gas is also beneficial for lowering a temperature of the combustible gas, thereby further preventing the occurrence of open flames.

To sum up, the fire-fighting apparatus 500 provided in the foregoing embodiment of the present application could reduce the risk of open flanges when thermal runaway occurs in the battery, while suppressing the spread of thermal runaway in the battery 40, to achieve the purpose of fire prevention and safety protection.

The air inlet end 511 of the pipe 510 may be directly connected to the box 410 of the battery 40, or indirectly connected thereto through an intermediate member, which is not limited in the present application.

In the embodiment of the present application, the fire-fighting gas may be any suitable gas as long as it can have a fire prevention effect after being mixed with the combustible gas.

In some embodiments of the present application, the fire-fighting gas may include a non-combustible gas such as an inert gas, carbon dioxide gas, heptafluoroproparre gas, sulfur hexafluoride, or the like.

In order to ensure the full mixing of the fire-fighting gas and the combustible gas, the blocking structure 530 may be configured to make a flow path of at least part of a gas in the pipe 510 a meandering shape, that is, through the blocking structure 530, the mixed gas of the fire-fighting gas and the combustible gas at least partially travels along a curved path toward the air outlet end 512 of the pipe 510 in the pipe 510. The advantages of the gas traveling in the pipe 510 in a meandering manner are as follows: on one hand, a mixing path of the fire-fighting gas and the combustible gas can be extended, and a mixing time of the fire-fighting gas and the combustible gas can be increased, thereby improving the mixing effect of the two; on another hand, traveling in a meandering manner intensifies the colliding and mixing of the fire-fighting gas and the combustible gas, thereby improving the mixing effect of the two and reducing the situation of the occurrence of fire due to the excessively high local concentration of the combustible gas even discharged from the pipe 510.

Here, the flow path of the gas in "the meandering shape" may mean that the flow path of the gas in the pipe 510 is any suitable curved shape such as an shape, a spiral shape, a sine/cosine wave, or the like.

In order to ensure that the gas travels in the pipe 510 in a meandering manner, in some embodiments of the present application, a projection of the blocking structure 530 in an extension direction of the pipe covers a projection of a cavity (that is, an inner passage) of the pipe 510 in the extension direction of the pipe 510. For example, in the embodiment shown in FIG. 6, a projection of two baffle plates 531 of the blocking structure 530 that are disposed at interval in an extension direction of the pipe 510 covers a projection of a cavity of the pipe 510 in the extension direction of the pipe 510, so that the combustible gas discharged from the box 410 and the fire-fighting gas both in the pipe 510 flow through the blocking structure 530 and travel in a meandering manner rather than in a straight line.

In the embodiment of the present application, the blocking structure 530 may have any appropriate structure as long as it can make a flow path of the gas a meandering shape when the gas flows through the blocking structure 530.

As shown in FIG. 7, in an embodiment of the present application, a blocking structure 530 may include a plurality of baffle plates 531, and the plurality of baffle plates 531 are arranged at interval in an extension direction of a pipe 510. The baffle plate 531 is provided with an opening 800 for a gas to pass through, or the baffle plate 531 encloses with an inner wall of the pipe 510 to form an opening 800 for a gas to pass through. The projections of two adjacent openings 800 in the extension direction of the pipe 510 are disposed to be misaligned, so that when the gas flows through the plurality of baffle plates 531, a flow path of the gas is in a meandering path. The baffle plate 531 can not only mix the gases, but also prevent a high-temperature particle entering the pipe 510 from the box 410 from flowing out of the pipe 510, thereby avoiding risks that may be caused by the outflow of the high-temperature particle, such as causing a fire.

As described above, in order to allow the gas to pass through the blocking structure 530, the baffle plate 531 may be provided with an opening 800, or the baffle plate 531 may enclose with an inner wall of the pipe 510 to form an opening 800, or the baffle plate 531 may be provided with an opening 800, and meanwhile the baffle plate 531 and the inner wall of the pipe 510 may also define the opening 800.

Figure 8:
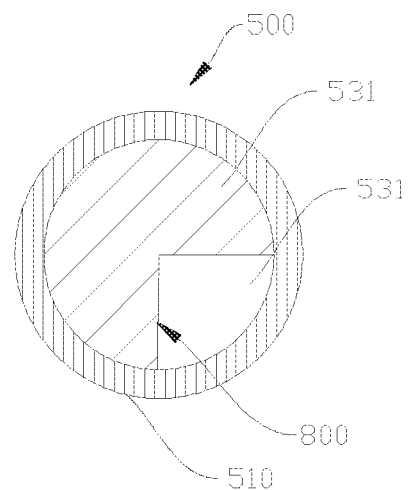
FIG. 8 is a schematic cross-sectional landscape diagram of a fire-fighting apparatus provided by an embodiment of the present application.
Figure 9:
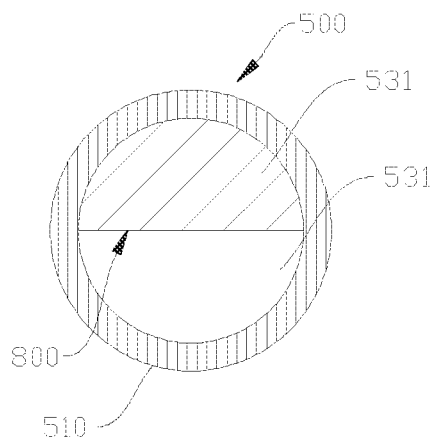
FIG. 9 is a schematic cross-sectional landscape diagram of a fire-fighting apparatus provided by another embodiment of the present application.

As shown in FIG. 8 and FIG. 9, in some embodiments of the present application, each baffle plate 531 encloses with the inner wall of the pipe 510 are enclosed to form an opening 800, and corresponding two adjacent openings 800 formed by enclosing the inner wall of the pipe 510 with baffle plate 531 are disposed to be misaligned. As shown in FIG. 8, a shape of the opening 800 is a quarter circle. As shown in FIG. 9, a shape of the opening 800 is a semicircle.

Figure 10:
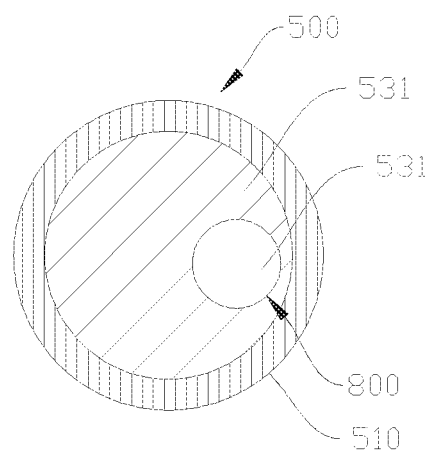
FIG. 10 is a schematic cross-sectional landscape diagram of a fire-fighting apparatus provided by yet another embodiment of the present application.

As shown in FIG. 10, in an embodiment of the present application, an opening 800 is formed on each baffle plate 531, and the two adjacent openings 800 formed by the baffle plates 531 and the inner wall of the pipe 510 are disposed to be misaligned. The shape of the opening 800 may be a circle.

It should be noted that the specific shape of the opening 800 is not limited in the present application, but may be determined according to the shape of the projection (that is, the cross section) of the pipe 510 in the extension direction of the pipe 510 and the shape of the baffle plate 531. In addition to the shapes shown in FIG. 8 to FIG. 10, it may be a square, a polygon, or the like.

Figure 11:
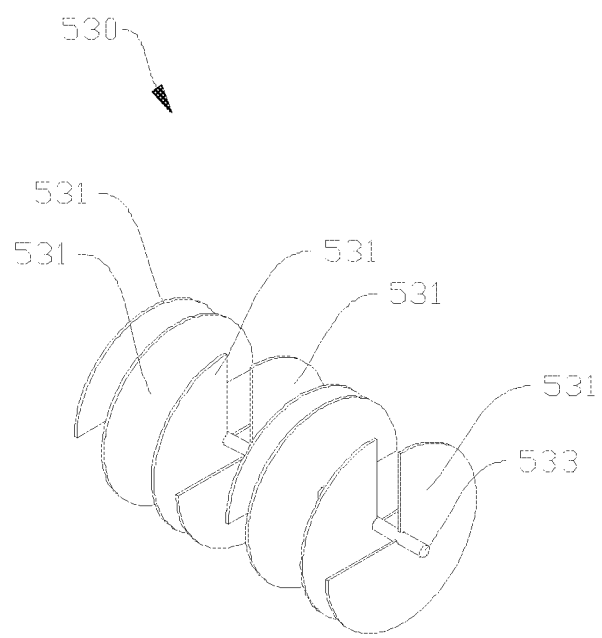
FIG. 11 is a schematic diagram of a three-dimensional structure of a blocking structure of a fire-fighting apparatus provided by an embodiment of the present application, where a plurality of baffles are shown.

As shown in FIG. 11, in an embodiment of the present application, the baffle plate 531 is a circular baffle plate with a quarter circular notch. A diameter of the circular baffle plate may be equal to an inner diameter of the pipe 510, so that when an outer edge of the circular baffle plate is connected to an inner wall of the pipe 510, the circular baffle plate and the inner wall of the pipe 510 may be enclosed to form an opening 800 with a quarter circle shape.

A plurality of the above-mentioned circular baffle plates with notches may be divided into two groups, and the two groups of circular baffle plates are arranged at interval in the extension direction of the pipe 510. Each group of circular baffle plates includes four circular baffle plates, the four circular baffle plates are arranged at interval in the extension direction of the pipe 510, and projections of quarter circular notches of two adjacent circular baffle plates in the extension direction of the pipe 510 are disposed to be misaligned. In this way, when the mixed gas of the fire-fighting gas and the combustible gas flows through the foregoing four circular baffle plates with notches, a flow path of the mixed gas is in a spiral shape, which is beneficial for the full mixing of the fire-fighting gas and the combustible gas.

As shown in FIG. 11, the plurality of baffle plates 531 may be connected as a whole through a first connecting of 533 to facilitate the connection between the plurality of baffle plates 531 and the pipe 510. For example, when the plurality of baffle plates 531 are installed, only one of the baffle plates 531 is needed to be connected to the inner wall of the pipe 510 rather than each baffle plate 531 to be connected to the inner wall of the pipe 510.

It can be understood that the number of the foregoing circular baffle plates with notches is not limited in the present application, and the number thereof may be eight as shown in FIG. 11, or may be only one group of the foregoing circular baffle plates, that is, four circular baffle plates are provided. Alternatively, only two circular baffle plates may be provided, so that a path of the gas flowing through the two circular baffle plates is S-shaped, which is also beneficial for the mixing of the fire-fighting gas and the combustible gas.

Figure 12:
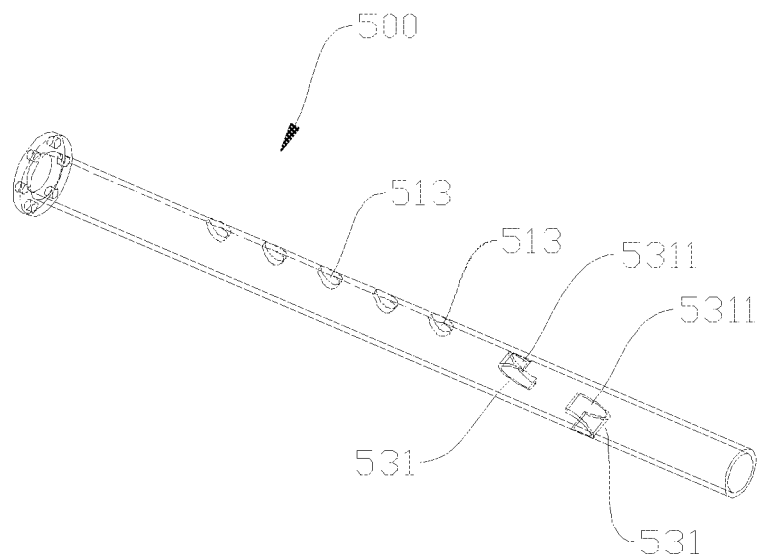
FIG. 12 is a schematic perspective view of a three-dimensional structure of a fire-fighting apparatus provided by an embodiment of the present application, where a C-shaped plate is shown.
Figure 13:
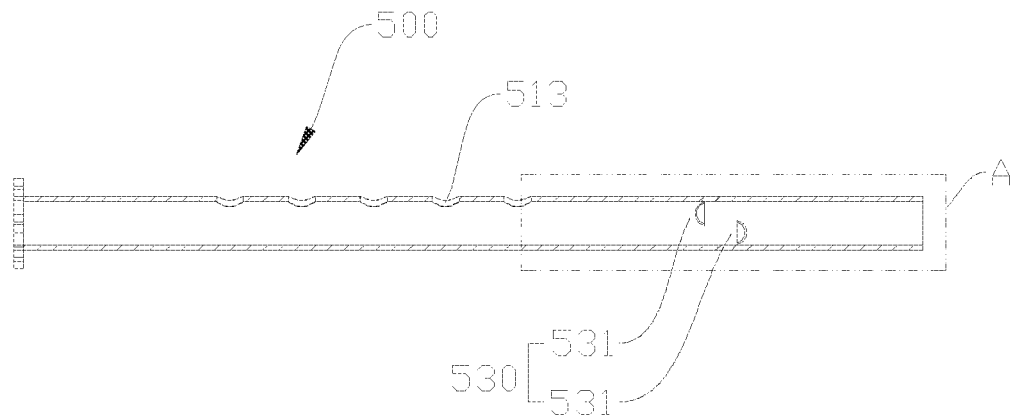
FIG. 13 is a schematic cross-sectional diagram of a fire-fighting apparatus in an extension direction of a pipe provided by another embodiment of the present application, where a spherical plate is shown.
Figure 14:
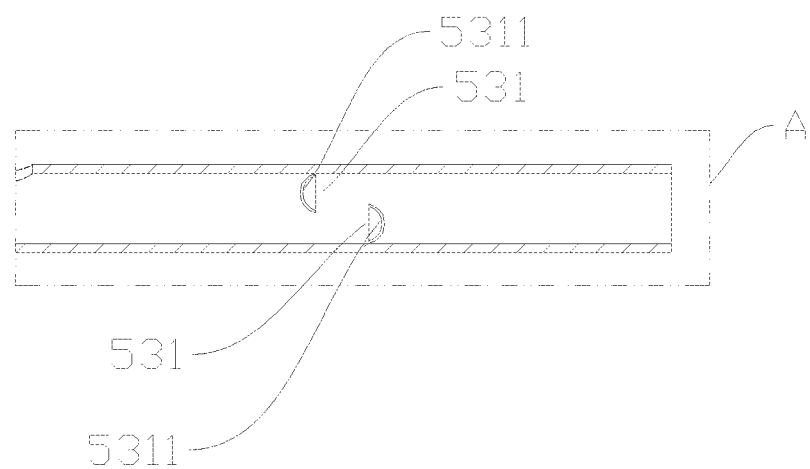
FIG. 14 is an enlarged schematic diagram of part A in FIG. 13.

As shown in FIG. 12-14, in some embodiments of the present application, a plurality of baffle plates 531 at least include a pair of arc-shaped plates, and concave surfaces 5311 of the pair of arc-shaped plates are disposed opposite to each other. Since the concave surfaces 5311 of the pair of arc-shaped plates are disposed opposite to each other, when a gas enters an interval of the pair of arc-shaped plates, a concave surface 5311 of one arc-shaped plate of the pair of arc-shaped plates can guide the gas toward the other arc-shaped plate, which could intensify the collision of gases between the pair of arc-shaped plates and increase the mixing time of the gases, and thus it is beneficial or a full mixing of the fire-fighting gas and the combustible gas.

It should be noted that the embodiment of the present application does not limit the specific shape of the arc-shaped plate. Optionally, the arc-shaped plate may be configured as a C-shaped plate as shown in FIG. 12, or as a spherical plate as shown in FIG. 13 and FIG. 14. The C-shaped plate and the spherical plate are simple in structure. In other embodiments of the present application, the arc-shaped plate may be an S-shaped plate, or the like.

Figure 15:
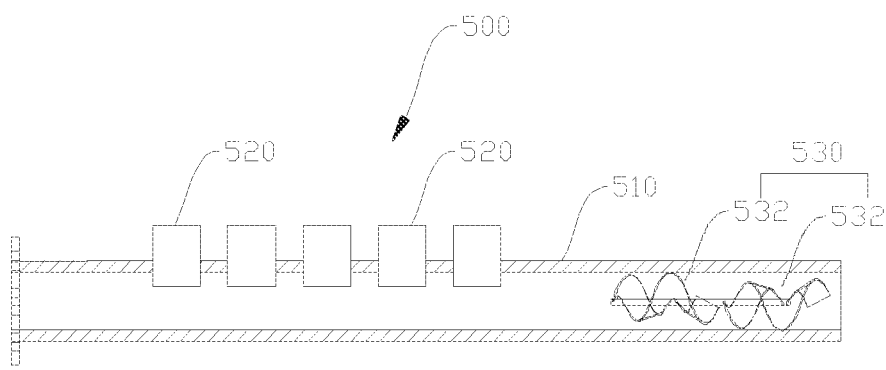
FIG. 15 is a schematic cross-sectional diagram of a fire-fighting apparatus in are extension direction of a pipe provided by an embodiment of the present application, where a spiral blade is shown and cross-sectional processing is not performed on a gas release mechanism.
Figure 16:
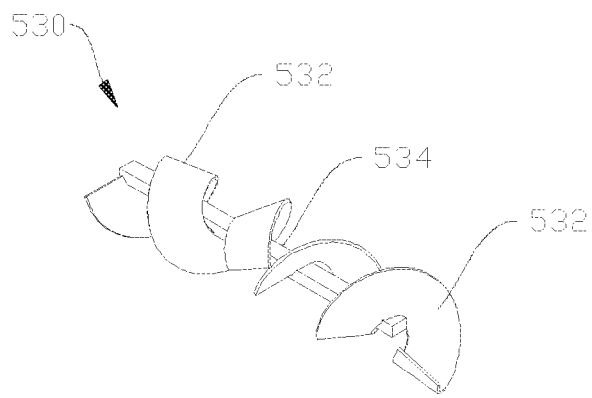
FIG. 16 is a schematic diagram of a three-dimensional structure of a blocking structure provided by an embodiment of the present application, where a spiral blade is shown.

As shown in FIG. 15 and FIG. 16, in an embodiment of the present application, a blocking structure 530 includes a spiral blade 532. A centerline of the spiral blade 532 may coincide with or be parallel to a central axis of the pipe 510, so that the spiral blade 532 can make a flow path of the mixed gas a spiral shape, which is beneficial for the full mixing of the fire-fighting gas and the combustible gas.

In order to further improve the mixing effect of the blocking structure 530 on the fire-fighting gas and the combustible gas, as shown in FIG. 15 and FIG. 16, there may be a plurality of spiral blades 532 (for example, two spiral blades), and the plurality of spiral blades 532 are arranged in an extension direction of the pipe 510, and directions of rotation of two adjacent spiral blades 532 are opposite. The spiral blades 532 with two different rotary directions may change a direction of rotation of the gas, which could further enhance the effect of mixing the gases.

As shown in FIG. 16, a plurality of spiral blades 532 may be connected as a whole through a second connecting rod 534 to facilitate the connection between the plurality of spiral blades 532 and the pipe 510. For example, when the plurality of spiral blades 532 are installed, may be enough to connect only one of the spiral blades 532 may be connected to the inner wall of the pipe 510 rather than connect each spiral blade 532 to the inner wall of the pipe 510.

FIG. 16 shows an embodiment in which there are two spiral blades 532. In other embodiments of the present application, the number of the spiral blades 532 may be multiple such as, three, four, five, or the like, which may be determined according to factors such as the size of the pipe 510 in the extension direction, and the present application does not limit thereto.

Figure 17:
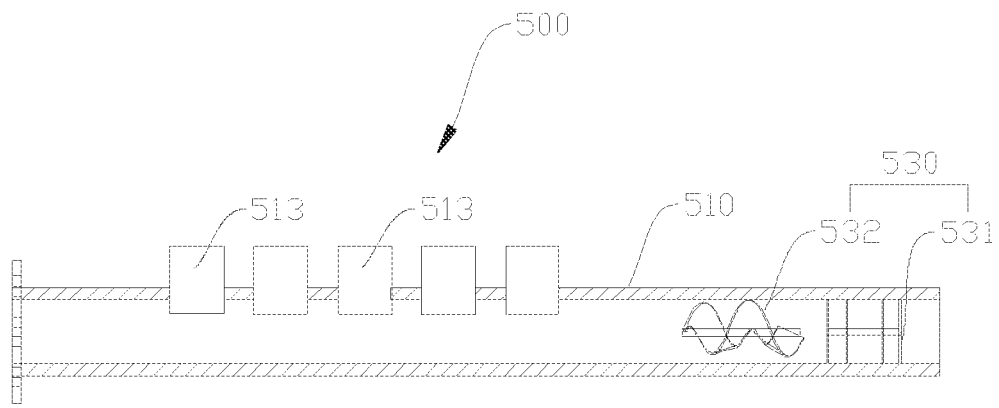
FIG. 17 is a schematic cross-sectional diagram of a fire-fighting apparatus in an extension direction of a pipe provided by an embodiment of the present application, where a spiral blade and a baffle are shown, and cross-sectional processing is not performed on a gas release mechanism.

In addition, as shown in FIG. 17, in an embodiment of the present application, a baffle plate 531 and a spiral blade 532 may be provided in the pipe 510 at the same time.

Figure 18:
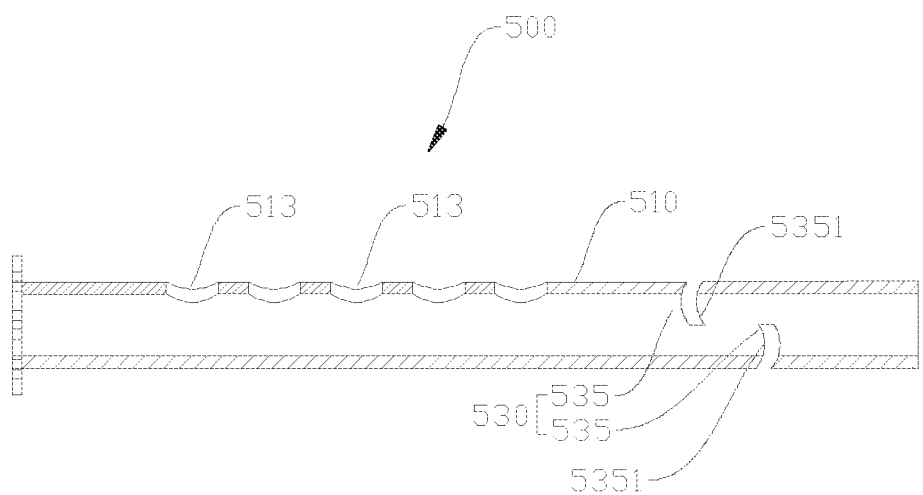
FIG. 18 is a schematic cross-sectional diagram of a fire-fighting apparatus in an extension direction of a pipe provided by an embodiment of the present application, where a convex part is shown.

In addition, as shown in FIG. 18, in an embodiment of the present application, a wall of the pipe 510 is recessed inwardly to form a convex part 535 in a cavity of the pipe 510 and the convex part 535 can play a role in blocking the air flow, changing the direction of the air flow, which is beneficial for the mixing of the fire-fighting gas and the combustible gas. That is, in this embodiment, the blocking structure 530 includes the convex part 535.

As shown in FIG. 18, there may be a plurality of convex parts 535, and the plurality of convex parts 535 are arranged at interval in an extension direction of the pipe 510, so as to further enhance the effect of blocking the gas and improve the effect of mixing the combustible gas and the fire-fighting gas.

In addition, as shown in FIG. 18, the plurality of convex parts 535 may include at least one pair of arc-shaped convex parts, and arc-shaped concave surfaces 5351 of the arc-shaped convex parts are disposed opposite to each other. When a gas enters an interval of the pair of arc-shaped convex parts, an arc-shaped concave surface of one arc-shaped convex part of the pair of arc-shaped convex parts can guide the gas towards the other arc-shaped convex part, which could intensify the collision of gases between the pair of arc-shaped convex parts and increase the mixing time of the gases, and thus it is beneficial for a full mixing of the fire-fighting gas and the combustible gas.

In addition, it should be noted that, in addition to the foregoing ways of arranging the baffle plate 531 and the spiral blades 532 in the pipe 510 or forming the convex part 535 by recessing the wall of the pipe 510 to construct the blocking structure 530, in other embodiments of the present application, a plurality of small protrusions may be provided on the inner wall of the pipe 510 to construct the blocking structure 530. In other embodiments, the cavity (that is, the internal passage) of the pipe 510 may also be designed, for example, the cavity is designed to include a plurality of cavity segments in the extension direction of the pipe 510, and at least one pressurized cavity segment is included in the plurality of cavity segments. In this way, when the fire-fighting gas and the combustible gas flow through the pressurized cavity segment, the flow rate is increased, which is beneficial for the uniform mixing of the two. Here, the pressurized cavity segment may be configured as a structure whose internal cavity is tapered along a direction from the air inlet end 511 to the air outlet end 512 of the pipe 510.

Figure 19:
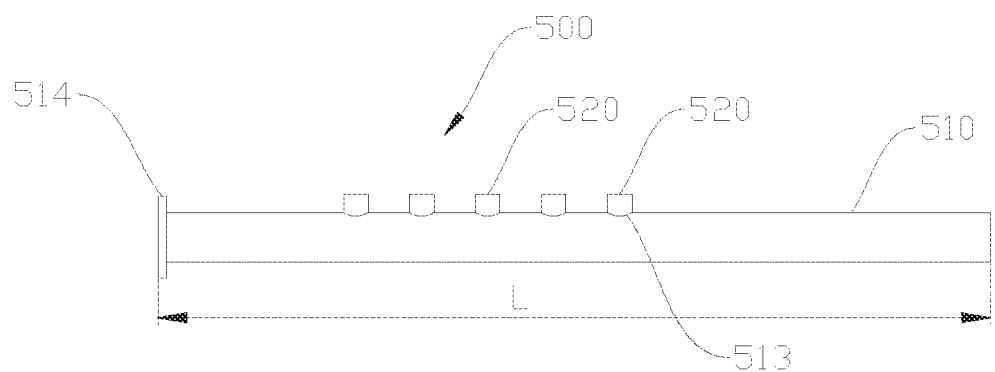
FIG. 19 is a schematic front view of a fire-fighting apparatus provided by an embodiment of the present application.

As shown in FIG. 17 to FIG. 19, in some embodiments of the present application, an installation position of the gas release mechanism 520 while compared with the blocking structure 530, is closer to the air inlet end 511, so as to facilitate the full mixing of the fire-fighting gas and the combustible gas through the blocking structure 530, thereby ensuring the mixing effect of the blocking structure 530 on the fire-fighting gas and the combustible gas.

It can be understood that in other embodiments of the present application, when the number of the blocking structures 530 is multiple, or each blocking structure 530 includes a plurality of baffle plates 531, the installation position of the gas release mechanism 520 on the pipe 510 may be located between the plurality of blocking structures 530, or between the plurality of baffle plates 531.

In an embodiment of the present application, the gas release mechanism 520 may be directly connected to the pipe 510, for example, plugged into the pipe 510. The gas release mechanism 520 may also be indirectly connected to the pipe 510, for example, the gas release mechanism 520 is connected to a gas guiding pipe and the gas guiding pipe extends from the air outlet end of the pipe 510 to a position close to the air inlet end 511 of the pipe 510, and the gas guiding pipe is configured to guide a gas released by the gas release mechanism 520 into the pipe 510.

As shown in FIG. 19, in some embodiments of the present application, the gas release mechanism 520 is directly installed at the pipe 510. The direct installation of the gas release mechanism 520 at the pipe 510 could shorten the time for the fire-fighting gas to enter the pipe 510, and omit an intermediate connector between the gas release mechanism 520 and the pipe 510, for example, omit the foregoing gas guiding pipe, and the structure could be simplified and the cost could be saved.

The gas release mechanism 520 may be disposed either outside or inside the pipe 510.

Figure 20:
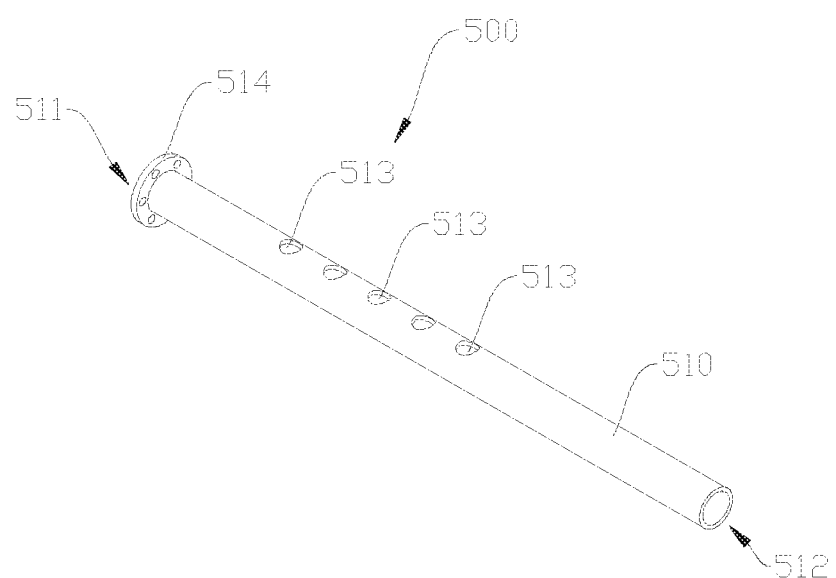
FIG. 20 is a schematic diagram of a three-dimensional structure of a fire-fighting apparatus provided by an embodiment of the present application, where a gas release mechanism is not shown.

As shown in FIG. 19 and FIG. 20, in an embodiment, of the present application, a gas release mechanism 520 may be disposed outside a pipe 510. A through hole 513 is provided on a wall of the pipe 510, and the gas release mechanism 520 is connected to the through hole 513 to release a fire-fighting gas into the pipe 510 through the through hole 513. The gas release mechanism 520 is disposed outside the pipe 510, so that a size of the gas release mechanism 520 may not be limited by a size of a cavity of the pipe 510, which is beneficial for the installation of the gas release mechanism 520 which has a larger gas production.

As shown in FIG. 19 and FIG. 20, in an embodiment of the present application, the number of through holes 513 is multiple, and the multiple through holes 513 are arranged at interval in an extension direction of the pipe 510. The multiple through holes 513 may ensure a rapid release of a sufficient amount of fire-fighting gas, thus ensuring the reliability of fire prevention.

Regarding the relationship between the through hole 513 and the gas release mechanism 520, each through hole 513 may correspond to one gas release mechanism 520, or multiple through holes 513 may correspond to one gas release mechanism 520. In other words, only one gas release mechanism 520 may be provided, and the gas release mechanism 520 is connected to the pipe 510 through the multiple through holes 513. A plurality of gas release mechanisms 520 may be provided, and each gas release mechanism 520 may correspond to one, two or any suitable number of through holes 513.

The foregoing through hole 513 may be configured as a threaded through hole 513 to form a threaded connection with the gas release mechanism 520, so as to ensure the reliability of the installation of the gas release mechanism 520 on the pipe 510 and the sealing connection of the gas release mechanism 520 and the pipe 510.

Optionally, a sealant (a sealing silicone rubber) may be provided at a connection position of the gas release mechanism 520 and the pipe 510 to further ensure the sealing performance of the connection between the gas release mechanism 520 and the inner wall of the through hole 513.

The embodiment of the present application does not limit a length L of the pipe. Optionally, as shown in FIG. 19, in an embodiment of the present application, the length L of the pipe is 50-200 cm. The advantages of setting the length L of the pipe within such a range are as follows: first, it facilitates the installation of the gas release mechanism 520, which is beneficial for the installation of a plurality of gas release mechanisms 520; second, a distance for lowering temperature is increased, so that the mixed gas of the fire-fighting gas and the combustible gas has a sufficient distance for lowering temperature, and thus the possibility of catching a fire at the air outlet end of the pipe 510 is reduced; third, a distance for exchanging the oxygen is increased, so that a high-temperature region near the box 410 becomes an oxygen-deficient region, thereby reducing the risk of open flames in the high-temperature region.

In order to facilitate the connection between the pipe 510 and the box 410, as shown in FIG. 19 and FIG. 20, in an embodiment of the present application, the air inlet end 511 of the pipe 510 is provided with a flange 514.

Figure 21:
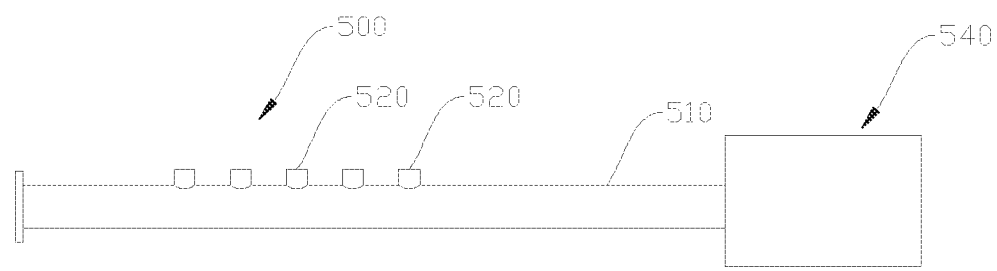
FIG. 21 is a schematic front view of a fire-fighting apparatus provided by an embodiment of the present application, where a gas collection device is shown.

As shown in FIG. 21, a fire-fighting apparatus 500 also includes a gas collection device 540, and the gas collection device 540 is hermetically connected to the air outlet end 512 of the pipe 510, and is configured to collect a gas discharged from the air outlet end, so as to prevent the mixed gas from being directly discharged to the external environment, and polluting the environment.

In an embodiment of the present application, the gas release mechanism 520 may have any suitable structure and shape. As shown in FIG. 22-25, the gas release mechanism 520 may include a fire-fighting medium 521 (a fire-fighting agent), a housing 522, and a closure member 523. The fire-fighting medium 521 may be a fire-fighting gas or a fire-fighting solid or a fire-fighting liquid capable of generating the fire-fighting gas. The housing 522 is configured to accommodate the fire-fighting medium 521, and the housing 522 is connected to the through hole 513, and the housing 522 is provided with an air outlet hole 5221. The closure member 523 is configured to enclose the air outlet hole 5221, and the closure member 523 is configured to release closure of the air outlet hole 5221 when thermal runaway occurs in the battery 40, so that the fire-fighting gas enters the pipe 510 through the air outlet hole 5221.

In this embodiment, when the battery 40 works normally, the closure member 523 closes the air outlet hole 5221. When thermal runaway occurs in the battery 40, the closure member 523 releases the closure of the air outlet hole 5221, that is, the air outlet hole 5221 opens, so that the fire-fighting gas in the housing 522 can enter the pipe 510 through the air outlet hole 5221 to realize mixing with the combustible gas.

Here, in addition to the inert gas, carbon dioxide gas, heptafluoropropane gas, sulfur hexafluoride, or the like, the fire-fighting gas may be any other appropriate gas that is helpful to prevent fires, which is not listed here.

The closure, member 523 may be configured to open when a pressure (such as the air pressure in the housing 522) reaches a certain value, or may be configured to open when a temperature reaches a certain value if the closure member 523 is a membrane or a pressure valve, for example, the closure member 523 is configured as a meltable membrane, to be capable of melting when the temperature reaches a certain value, so as to open the air outlet hole 5221.

Figure 22:
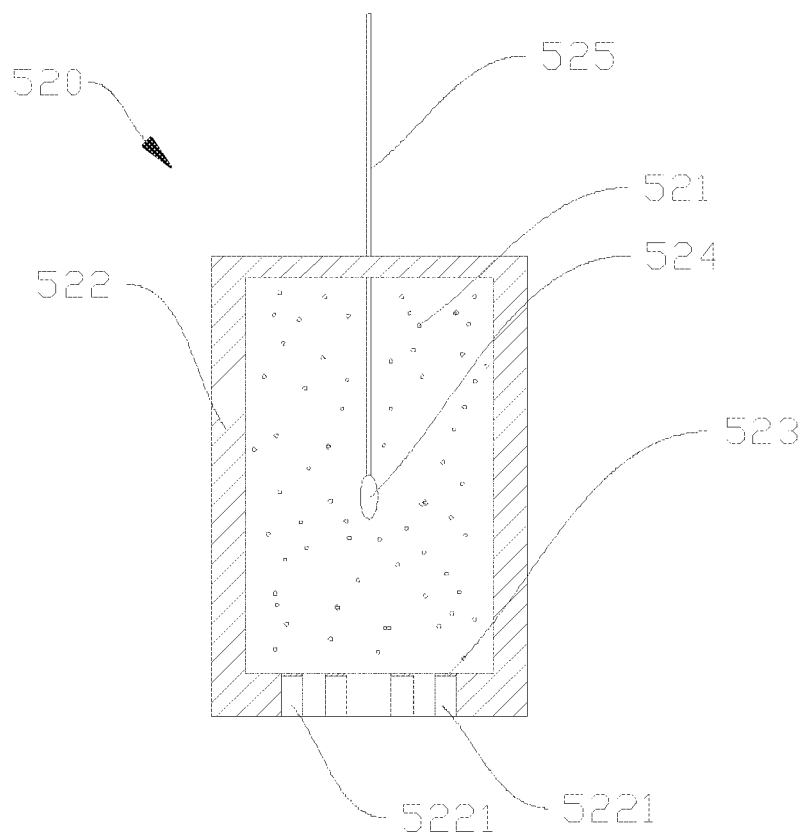
FIG. 22 is a schematic cross-sectional diagram of a gas release mechanism of a fire-fighting apparatus provided by an embodiment of the present application.
Figure 23:
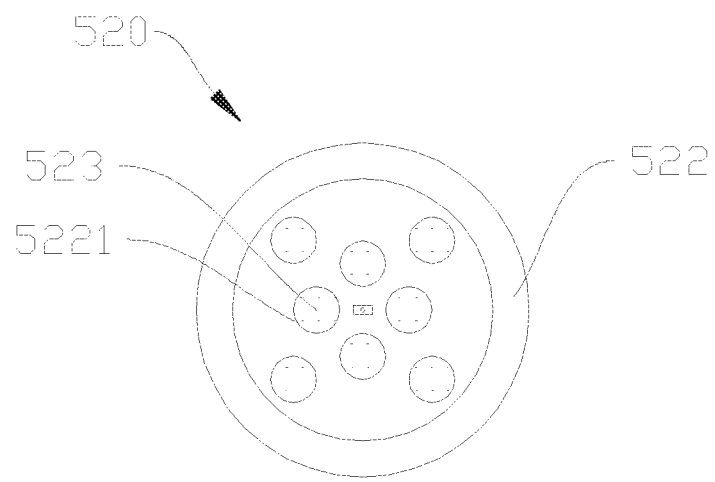
FIG. 23 is a schematic bottom view of a gas release mechanism of a fire-fighting apparatus provided by an embodiment of the present application.

As shown in FIG. 22 and FIG. 23, the fire-fighting medium 521 is a fire-fighting solid or a fire-fighting liquid, the gas release mechanism 520 further includes a trigger 524, and the trigger 524 is configured to trigger the fire-fighting solid or fire-fighting liquid to generate a fire-fighting gas when thermal runaway occurs in the battery. The closure member 523 is configured to be able to open the air outlet hole 5221 when the air pressure in the housing 522 reaches a first threshold, so as to release the fire-fighting gas.

In this embodiment, when thermal runaway occurs in the battery 40, the trigger 524 triggers the fire-fighting medium 521 to generate a large amount of fire-fighting gas, and the fire-fighting gas gathers in the housing 522 so that the air pressure in the housing 522 increases. When the air pressure reaches the first threshold, the air outlet hole 5221 opens through the closure member 523, and the fire-fighting gas in the housing 522 enters the pipe 510 through the through hole 513.

The trigger 524 may be an electrically controlled thermal initiator, which generates heat when thermal runaway occurs in the battery, so as to trigger the fire-fighting solid or the fire-fighting liquid to generate the fire-fighting gas.

In addition, the foregoing "first threshold" may be any appropriate value, and the specific parameter may be determined according to the actual situation.

In an embodiment of the present application, a controller may be used to send a trigger signal to the trigger 524. The controller configured to send the trigger signal to the trigger 524 may be a controller of the battery 40 or a built-in controller of the fire-fighting apparatus 500. The controller may detect the thermal runaway of the battery 40 through, for example, a temperature sensor or a smoke sensor, or the like. When the thermal runaway occurs in the battery 40, the temperature sensor or the smoke sensor may send the detected result to the controller, and then the controller controls the trigger 524 to work according to the detection structure of the temperature sensor or the smoke sensor.

As shown in FIG. 22, the gas release mechanism 520 also includes a lead 525, one end of the lead 525 is electrically connected to the trigger 524, and another end thereof may pass through the housing 522 and be electrically connected to an external controller. The controller sends, to the trigger 524 through the lead 525, a trigger signal used for triggering the fire-fighting medium 521 to generate the gas. In other embodiments, the controller may communicate wirelessly with the trigger 524.

Figure 25:
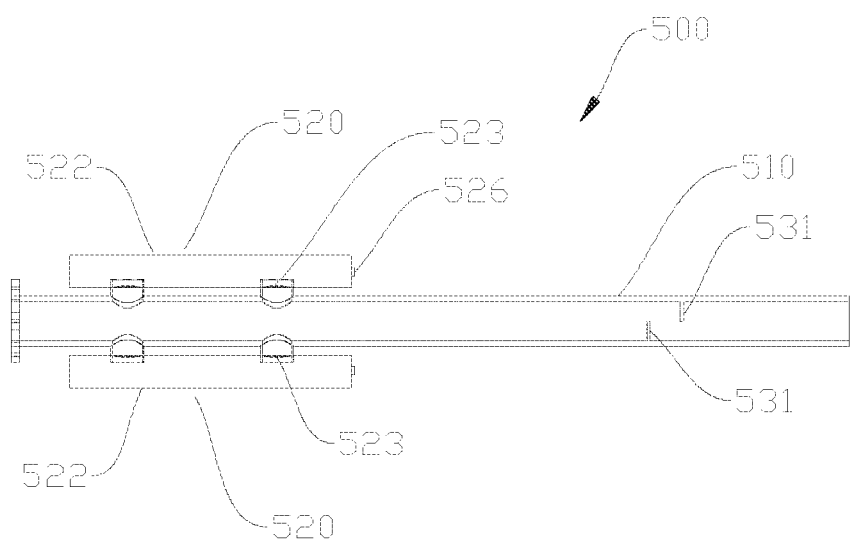
FIG. 25 is a schematic front view of a gas release mechanism of a fire-fighting apparatus provided by another embodiment of the present application.

As shown in FIG. 2.4 and FIG. 25, in another embodiment of the present application, a fire-fighting medium 521 is a fire-fighting liquid or a fire-fighting gas capable of generating a fire-fighting gas, and the fire-fighting liquid or the fire-fighting gas is encapsulated in a housing 522. When a closure member 523 closes the air outlet hole 5221, a pressure in the housing 522 is greater than a pressure in the pipe 510, that is, the fire-fighting liquid or the fire-fighting gas is pressurized and encapsulated in the housing 522, and the closure member 523 is a valve, such as an electric control valve.

In this embodiment, when the battery 40 is in normal conditions, a certain pressure is maintained in the housing 522, and the closure member 523 closes the air outlet hole 5221. If the fire-fighting medium 521 is the fire-fighting liquid, when thermal runaway occurs in the battery 40, the air outlet hole 5221 opens through the closure member 523, so that the inner portion of the housing 522 communicates with the inner portion of the pipe 510, and the pressure in the housing 522 decreases, so that the fire-fighting liquid is vaporized and enters the pipe 510 through the air outlet hole 5221.

In this embodiment, when the fire-fighting medium 521 is the fire-fighting gas, since the fire-fighting gas is pressurized and encapsulated in the housing 522, the fire-fighting gas may be sprayed into the pipe 510 when the air outlet hole 5221 opens through the closure member 523, thereby ensuring the reliability of releasing the gas into the pipe 510 by the gas release mechanism 520.

Figure 24:
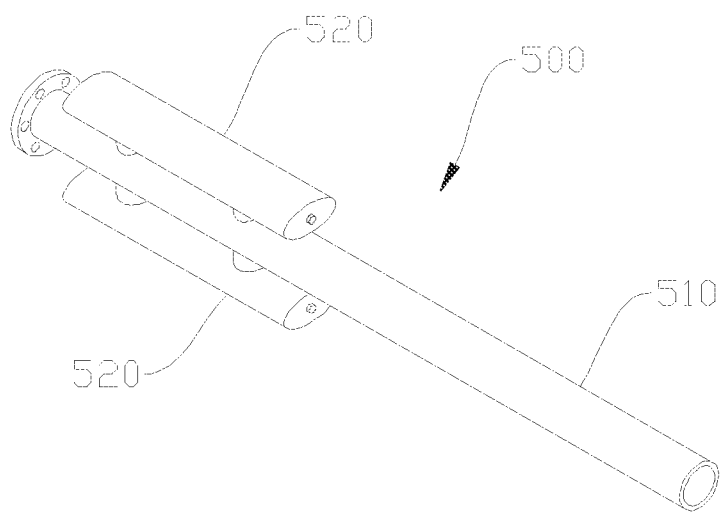
FIG. 24 is a schematic diagram of a three-dimensional structure of a gas release mechanism of a fire-fighting apparatus provided by another embodiment of the present application.

As shown in FIG. 24 and FIG. 25, the housing 522 is also provided with a sealing valve 526 configured to input the fire-fighting liquid or the fire-fighting gas.

In the embodiment of the present application, the fire-fighting medium may be one or more of the fire-fighting solid, the fire-fighting liquid and the fire-fighting gas, which is not limited in the present application.

The fire-fighting solid, such as a solid aerosol, is adjustable in both size and shape, and also has a large gas production per unit volume, which can maximize the space utilization. The fire-fighting solid is triggered to generate the gas when the thermal runway occurs, forming an aerosol form.

Optionally, the fire-fighting medium 521 may be selected from a substance that can generate a free radical scavenger or contain a free radical scavenges, and the free radical scavenger, also known as a free radical capture agent is a substance that can react with an active free radical to form a stable free radical or a stable molecule. For example, 2,2-diphenyl-1-trinitrophenylhydrazine (DPPH), p-benzoquinone, tetramethylbenzoquinone, 2-methyl-2-nitrosomethane, and phenyl-N-tert-butyl nitrone, etc. can react with the free radical to form a stable free radical.

In this embodiment, the fire-fighting medium 521 is solid potassium nitrate, which thermally decomposes to form a free radical scavenger. The free radical scavenger is easier to combine with oxygen (including oxygen in the gas discharged from the pressure relief mechanism 700, oxygen in the pipe 510, and oxygen in the external environment) or a substance discharged from the pressure relief mechanism 700 that is easy to combine with oxygen to generate a high-temperature combustible substance, and the substance combined with the free radical scavenger is a combustible free radical. The free radical scavenger can consume a combustible free radical generated after the thermal runaway of the battery 40, which reduces the possibility of combining and combusting of the combustible free radical and oxygen, and reduces the possibility of generating open flames from tackling the root cause. The free radical scavenger combining with the combustible free radical can generate inert gas such as nitrogen, the inert gas is difficult to chemically react with oxygen or other substances, and occupies the internal space of the pipe 510, so as to reduce the oxygen content in the pipe 510, dilute the gas in the pipe 510 and reduce the concentration of combustible substances and oxygen in the pipe 510. The inert gas occupying the inner space of the pipe 510 also acts as a barrier between the external air and the gas discharged from the pressure relief mechanism 700, thereby reducing or avoiding the contact between the external air and the gas discharged from the pressure relief mechanism 700. In addition, decomposition of the reagent absorbs heat, which could lower the temperature in the pipe 510 and further prevent the generation of open flames. Different reagents produce different free radical scavengers, and the combustible free radicals that can be combined with are also different, so that different inert gases can be produced.

The fire-fighting liquid may be liquid sulfur hexafluoride or hexafluoropropane, and the gasification thereof can achieve the effect of lowering the temperature. Since sulfur hexafluoride or hexafluoropropane has strong electrical insulation characteristics, it, can dilute the combustible gas while protecting the high voltage circuit of the battery 40.

In an embodiment of the present application, the housing 522 of the gas release mechanism 520 may be a steel housing such as a stainless steel housing) to ensure the strength of the housing 522.

Figure 26:
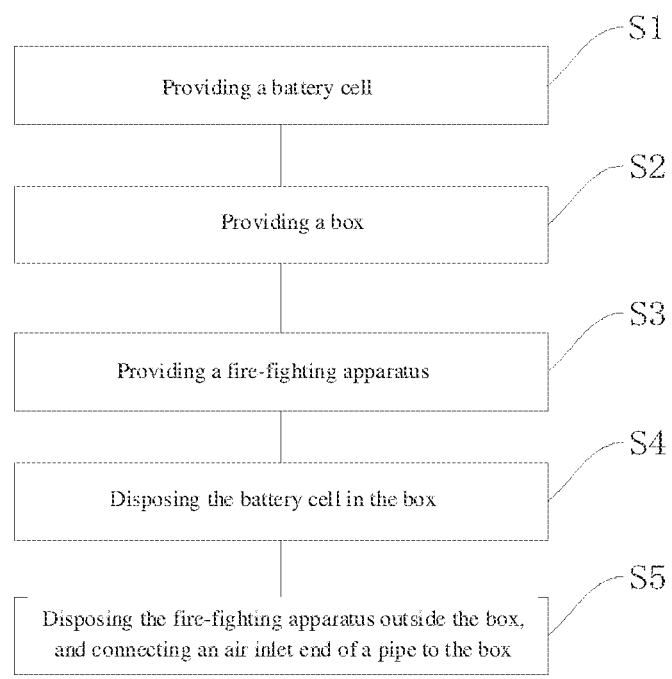
FIG. 26 is a schematic flowchart of a method for preparing a battery provided by an embodiment of the present application.

According to another aspect of the present application, a method for producing a battery is provided, as shown in FIG. 26, the method includes the following steps.

S1, providing a battery cell 600; S2, providing a box 410;
S3: providing a fire-fighting apparatus 500, the fire-fight apparatus 500 includes a pipe 510 and a gas release mechanism 520, the pipe 510 has an air inlet end 511 and an air outlet end, and the air inlet end 511 is configured to be connected to the box 410, so that a combustible gas generated in the battery during a thermal runaway is capable of entering the pipe 510 from the box 410 via the air inlet end 511 and being discharged from the pipe 510 via the air outlet end 512. The gas release mechanism 520 is connected to the pipe 510, and the gas release mechanism 520 is configured to release a fire-fighting gas into the pipe 510 when thermal runaway occurs in the battery. A blocking structure 530 is provided in the pipe 510, and the blocking structure 530 is configured to block the fire-fighting gas and the combustible gas and change a flow direction, so that the combustible gas and the fire-fighting gas are capable of being mixed before being discharged from the pipe 510;

S4: disposing the battery cell 600 in the box 410; and S5: disposing the fire-fighting apparatus 500 outside the box 410, and connecting the air inlet end 511 to the box 410.

It should be noted that the sequence of the foregoing steps can be adjusted as required. For example, may first connect the air inlet end 511 of the pipe 510 of the fire-fighting apparatus 500 with the box 410 to form a box assembly 400, then place the battery cell 600 in the box 410 of the box assembly 400.

The pipe 510, the gas release mechanism 520, and the blocking structure 530 may be the foregoing pipe 510, the foregoing gas release mechanism 520, and the foregoing blocking structure 530.

The foregoing descriptions are merely preferred embodiments of the present application, and are not intended to limit the present application. For a person of skilled in the art, the present application may have various modifications and variations. Any modification, equivalent substitution, improvement etc., made within the spirit and principle of the present application shall fall within the protection scope of the present application.

What is claimed is:

1. A fire-fighting apparatus configured for a battery, comprising:
a pipe, having an air inlet end and an air outlet end, the air inlet end being configured to be connected to a box of the battery, so that a combustible gas generated when thermal runaway occurs in the battery is capable of entering the pipe from the box via the air inlet end and is discharged from the pipe via the air outlet end; and
a gas release mechanism, configured to be connected to the pipe, the gas release mechanism being configured to release a fire-fighting gas into the pipe when thermal runaway occurs in the battery;
wherein a blocking structure is provided in the pipe, and the blocking structure is configured to block the combustible gas and the fire-fighting gas and change a flow direction, so that the combustible gas and the fire-fighting gas are capable of being mixed before being discharged from the pipe;
the blocking structure comprises a plurality of baffle plates, the plurality of baffle plates are arranged at interval in an extension direction of the pipe, and the baffle plates are each provided with an opening for a gas to pass through, or the baffle plates each enclose with an inner wall of the pipe to form an opening for a gas to pass through, wherein projections of two adjacent openings of the baffle plates in the extension direction of the pipe are disposed to be misaligned.

2. The fire-fighting apparatus according to claim 1, wherein the blocking structure is configured to make a flow path of at least part of a gas in the pipe a meandering shape.

3. The fire-fighting apparatus according to claim 2, wherein a projection of the blocking structure in the extension direction of the pipe covers a projection of a cavity of the pipe in the extension direction of the pipe.

4. The fire-fighting apparatus according to claim 1, wherein the plurality of baffle plates at least comprise a pair of arc-shaped plates, and concave surfaces of the pair of arc-shaped plates are disposed opposite to each other.

5. The fire-fighting apparatus according to claim 1, wherein the blocking structure comprises a spiral blade, and a centerline of the spiral blade coincides with or is parallel to a central axis of the pipe.

6. The fire-fighting apparatus according to claim 1, wherein the blocking structure comprises a plurality of spiral blades, the plurality of spiral blades are arranged in the extension direction of the pipe, and directions of rotation of two adjacent spiral blades are opposite.

7. The fire-fighting apparatus according to claim 1, wherein the gas release mechanism is installed at the pipe.

8. The fire-fighting apparatus according to claim 7, wherein an installation position of the gas release mechanism while compared with the blocking structure, is closer to the air inlet end.

9. The fire-fighting apparatus according to claim 7, wherein the gas release mechanism is provided outside the pipe, a through hole is provided on a wall of the pipe, and the gas release mechanism is connected to the through hole, to release the fire-fighting gas into the pipe through the through hole.

10. The fire-fighting apparatus according to claim 9, wherein the through hole is multiple in quantity, and multiple the through holes are arranged at interval in the extension direction of the pipe.

11. The fire-fighting apparatus according to claim 9, wherein the gas release mechanism comprises:
a fire-fighting medium, the fire-fighting medium being the fire-fighting gas or a fire-fighting solid or a fire-fighting liquid capable of generating the fire-fighting gas;
a housing, configured to accommodate the fire-fighting medium, the housing being connected to the through hole and being provided with an air outlet hole; and
a closure member, configured to close the air outlet hole, the closure member being configured to be capable of releasing closure of the air outlet hole when thermal runaway occurs in the battery, so that the fire-fighting gas enters the pipe through the air outlet hole.

12. The fire-fighting apparatus according to claim 11, wherein the fire-fighting medium is the fire-fighting solid or the fire-fighting liquid, and the gas release mechanism further comprises a trigger, the trigger is configured to trigger the fire-fighting solid or the fire-fighting liquid when thermal runaway occurs in the battery to generate the fire-fighting gas, and the closure member is configured to be capable of opening the air outlet hole to release the fire-fighting gas when an air pressure in the housing reaches a first threshold.

13. The fire-fighting apparatus according to claim 11, wherein the fire-fighting medium is the fire-fighting gas or the fire-fighting liquid capable of generating the fire-fighting gas, and the fire-fighting liquid or the fire-fighting gas is encapsulated in the housing, and when the air outlet hole is closed by the closure member, a pressure in the housing is greater than a pressure in the pipe, and the closure member is a valve, a length of the pipe is 50-200 cm;
the fire-fighting apparatus further comprises a gas collection device, and the gas collection device is hermetically connected to the air outlet end to collect a gas discharged from the air outlet end.

14. A box assembly, comprising:
a box, configured to accommodate a battery cell;
the fire-fighting apparatus according to claim 1, the fire-fighting apparatus being provided outside the box, and the air inlet end of the fire-fighting apparatus being connected to the box; and
a pressure relief mechanism, configured to be actuated when an air pressure or temperature in the box reaches a threshold, so that a combustible gas in the box is capable of entering the pipe from the air inlet end.

* * * * *